US009369874B2

(12) United States Patent
Otiato et al.

(10) Patent No.: US 9,369,874 B2
(45) Date of Patent: Jun. 14, 2016

(54) CONTROLLING NETWORK ACCESS USING A WRAPPER APPLICATION EXECUTING ON A MOBILE DEVICE

(71) Applicants: Bernard Mallala Otiato, St. Louis, MO (US); Abdiel Louis, St. Louis, MO (US)

(72) Inventors: Bernard Mallala Otiato, St. Louis, MO (US); Abdiel Louis, St. Louis, MO (US)

(*) Notice: Subject to any disclaimer, the term of this patent is extended or adjusted under 35 U.S.C. 154(b) by 65 days.

(21) Appl. No.: 14/511,106

(22) Filed: Oct. 9, 2014

(65) Prior Publication Data
US 2016/0029218 A1  Jan. 28, 2016

Related U.S. Application Data

(60) Provisional application No. 62/029,466, filed on Jul. 26, 2014.

(51) Int. Cl.
G06F 15/16   (2006.01)
H04L 29/06   (2006.01)
H04W 12/08   (2009.01)
H04W 12/06   (2009.01)
G06F 17/30   (2006.01)

(52) U.S. Cl.
CPC .......... *H04W 12/08* (2013.01); *H04L 63/0876* (2013.01); *H04W 12/06* (2013.01)

(58) Field of Classification Search
None
See application file for complete search history.

(56) References Cited

U.S. PATENT DOCUMENTS

| 9,178,880 | B1* | 11/2015 | Dotan | H04L 63/0876 |
| 2008/0133647 | A1* | 6/2008 | Hamzeh | G06F 17/30861 709/202 |
| 2012/0058826 | A1* | 3/2012 | Amaitis | G07F 17/3218 463/42 |
| 2013/0031462 | A1* | 1/2013 | Calvo | G06F 9/545 715/234 |
| 2014/0053238 | A1* | 2/2014 | Brannon | H04L 63/0861 726/1 |
| 2014/0082117 | A1* | 3/2014 | Unhale | H04L 67/306 709/208 |
| 2015/0095645 | A1* | 4/2015 | Eldar | G06F 21/6209 713/168 |

OTHER PUBLICATIONS

Ugus, O. "A Smartphone Security Architecture for App Verification and Process Authentication", Jul. 30, 2012-Aug. 2, 2012, pp. 1-9.*

* cited by examiner

*Primary Examiner* — Dede Zecher
*Assistant Examiner* — Trang Doan

(57) ABSTRACT

Computerized methods and systems for permitting wireless access to a network by way of a wrapper application executing on the user device. The wrapper application is configured to authenticate the user device and determine a uniquely identifiable virtual persona for the user device based on successfully authenticating the device. The methods and systems selectively permit wireless access to the network by the user device via the wrapper application based on the authentication and the uniquely identifiable virtual persona. The methods and systems further include selectively executing secondary application(s) within the context of the wrapper application based on predefined criteria and the uniquely identifiable virtual persona, as well as collecting analytical information regarding the wireless network access including usage of the wrapper application and the uniquely identifiable virtual persona.

19 Claims, 4 Drawing Sheets

CONTROLLING NETWORK ACCESS USING A WRAPPER APPLICATION EXECUTING ON A MOBILE DEVICE

CROSS-REFERENCE TO RELATED APPLICATION

This application claims the benefit of U.S. Provisional Application 62/029,466, filed Jul. 26, 2014.

BACKGROUND

Typically, controlling device access to a wireless network has been accomplished using a few limited techniques, most of which involve limiting access by way of server-side or router-side technology. For example, a wireless network operator may use a "captive portal" technique to control network access through the wireless access point/router, e.g., wireless access to the Internet. The captive portal technique forces an HTTP client on a network, such as a web browser, to receive a particular web page prior to allowing the HTTP traffic through the router. For example, a user may attempt to access a website on their mobile device upon connecting to the operator's wireless network, such as a wireless network in a coffee shop. The user may then be presented with a Terms and Conditions page that must be accepted prior to accessing the Internet, or the user may be presented with a payment page to provide payment details, e.g, credit card information, in order to access the Internet through the operator's wireless network. Once the user has performed the required steps, the user's device is authorized to use the network. While this technique can be useful for basic wireless access control, this technique is generally not effective for permitting certain types of traffic, while restricting others. In other words, once the user's device has been authorized to access the network, the captive portal technique is effectively useless for preventing a user from accessing the Internet using an iTunes or Facebook mobile application.

An operator may also restrict network access by utilizing specialized hardware and software applications that permit an operator to require each user to uniquely authenticate themselves on the network based on predefined login credentials. Using this complex mixture of specialized hardware and software, the operator may then specify specific levels of access for each individual. This process often requires an express synchronization of effort between the operator and each individual user, i.e., one-on-one support, to establish access levels appropriate for the user, to communicate the login credentials required to access the network, and to assist the user with manually configuring their device to properly connect to the network.

Generally speaking, however, there is presently not a "middle ground" for controlling network access in a manner that minimally involves the user, but still allows a wireless network operator to control which types of network traffic the wireless network will accept from the user's device, e.g., which mobile applications are allowed to send/receive data across the wireless network.

BRIEF SUMMARY OF THE INVENTION

The following presents a simplified summary in order to provide a basic understanding of some aspects of the invention. This summary is not an extensive overview. It is not intended to identify key or critical elements of the invention or to delineate the scope of the invention. The following summary merely presents some concepts of the invention in a simplified form as a prelude to the more detailed description provided below.

A computerized method embodying aspects of the present invention for permitting wireless access to a network to a user device based on predefined criteria, comprises, among other things, providing a wrapper application for execution on the user device and receiving, at one or more wireless access point ("WAP") devices operatively connected to the network, a wireless transmission from the user device via the wrapper application requesting network access. The wrapper application is configured to authenticate the user device, determine a uniquely identifiable virtual persona for the user device based on successfully authenticating the user device, and selectively execute one or more secondary applications within the context of the wrapper application based on the predefined criteria and the uniquely identifiable virtual persona. The method further comprises selectively permitting, by the one or more WAP devices, wireless access to the network by the user device via the wrapper application based on the authentication and the uniquely identifiable virtual persona. The method additionally comprises collecting analytical information regarding the wireless network access including usage of the wrapper application and the uniquely identifiable virtual persona.

Another aspect of the present invention provides computerized method for wirelessly accessing a network via a user device, the user device accessing the network via a wireless access point ("WAP") performing wireless access control ("WAC"). The method comprises, among other things, executing, on the user device, a wrapper application executing on the user device. The wrapper application is configured to authenticate the user device, determine a uniquely identifiable virtual persona for the user device based on successfully authenticating the device, and selectively execute one or more secondary applications within the context of the wrapper application based on the uniquely identifiable virtual persona. The method further comprises transmitting, via the wrapper application executing on the user device, a request to the wireless access point for network access, with the request including said identifiable virtual persona. The method additionally comprises receiving, at the user device executing the wrapper application, access to the network based on the request.

For example, a computerized system for providing wireless access control ("WAC") of one or more user devices to a network via a wrapper application executing on the one or more user devices, may comprise one or more wireless access point ("WAP") devices, with the one or more wireless access point devices being operatively connected to the network. The system may further comprise one or more WAC computing devices for executing computer-executable instructions for performing one or more WAC functions. The functions include, but are not limited to, configuring the one or more WAP devices to selectively permit access to the network by the one or more user devices executing the wrapper application, with the wrapper application being configured to authenticate said user device. The functions further include determining a uniquely identifiable virtual persona for the user device based on successfully authenticating the user device, and selectively executing one or more secondary applications within the context of the wrapper application based on the predefined criteria and the uniquely identifiable virtual persona. The functions may also include receiving, at one or more wireless access point ("WAP") devices operatively connected to the network, a wireless transmission from the user device requesting network access, selectively permitting, by the one or more WAP devices, wireless access to the network by the user device via the wrapper application based on the authentication and the uniquely identifiable virtual persona, and then collecting analytical information regarding the wireless network access including usage of the wrapper application and the uniquely identifiable virtual persona.

By way of demonstration and not limitation, the wrapper application described herein advantageously facilitates the leasing of wifi/high density wifi usage for mobile applications. The authorized secondary applications within the wrapper application provide wireless access to a network that is otherwise restricted, in a manner that increases user engagement for the particular business/venue/event. The wrapper app additionally permits governance, session management and security for the approved secondary applications that have been granted access to the network for the leased period of time. According to aspects of the present invention, the wrapper app also provides analytics, audit logs, user engagement statistics, and usage statistics to the business/venue. By way of demonstration and not limitation, the systems and methods described herein for permitting wireless network access may be advantageously used in a variety of venues to increase and track user engagement, such as, but not limited to, sports stadiums (e.g., soccer, football, baseball, etc.), educational institutions such as universities and schools, convention centers, zoos, music concerts, special interest events like ComiCon, medical conventions, venues that attract large numbers of people, etc.

DETAILED DESCRIPTION

In the following description of the various embodiments, reference is made to the accompanying drawings, which form a part hereof, and in which is shown by way of illustration various embodiments in which features may be practiced. It is to be understood that other embodiments may be utilized and structural and functional modifications may be made.

Figure 1:
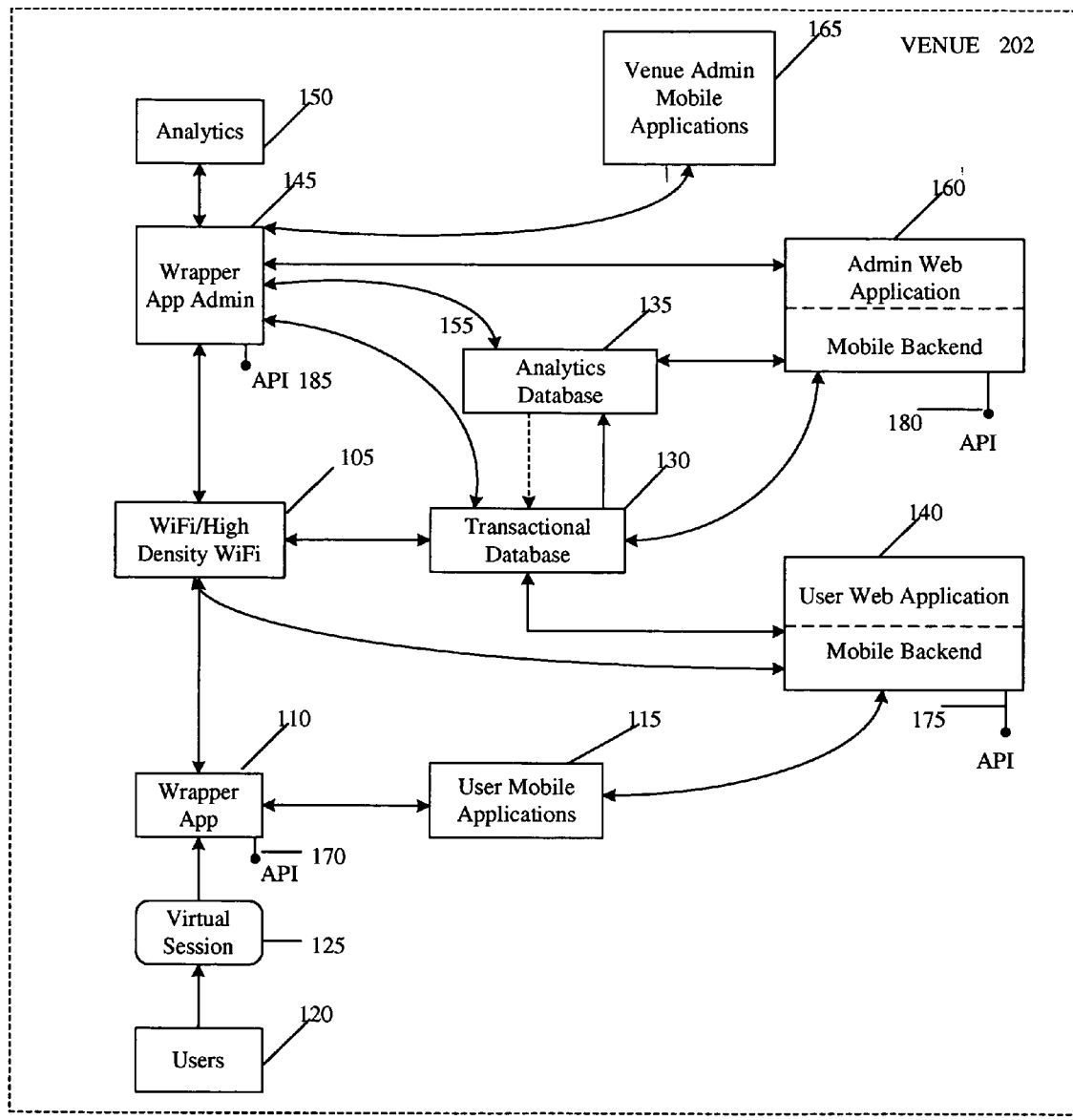
FIG. 1 illustrates an exemplary diagram of a system and method for controlling wireless access in a particular venue, according to various aspects described herein.
Figure 2A:
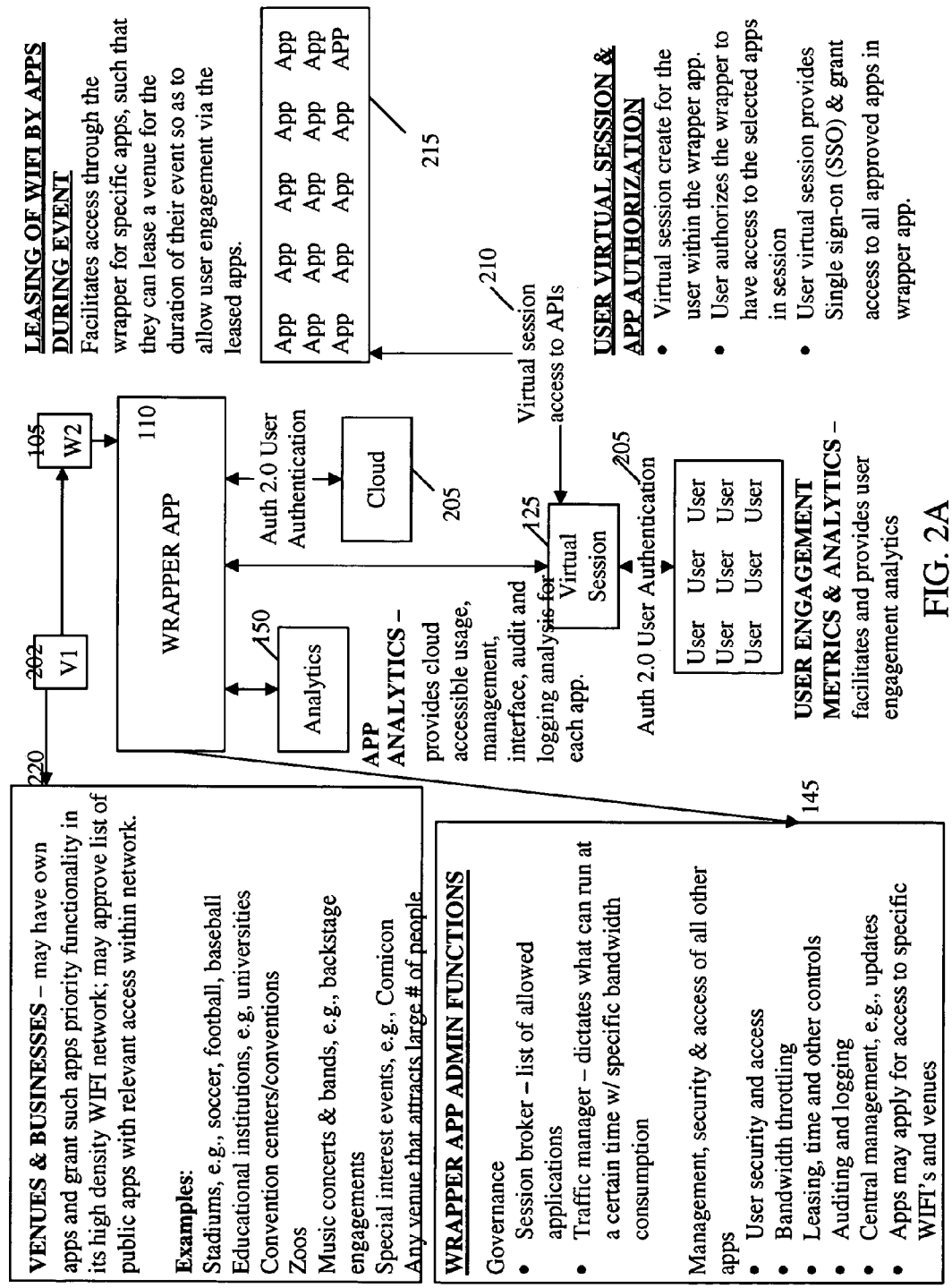
FIGS. 2A and 2B illustrates an additional exemplary diagram of a system and method for controlling wireless access at a venue, business, geographical location, or other suitable locations/situations, according to various aspects as described herein.
Figure 2B:
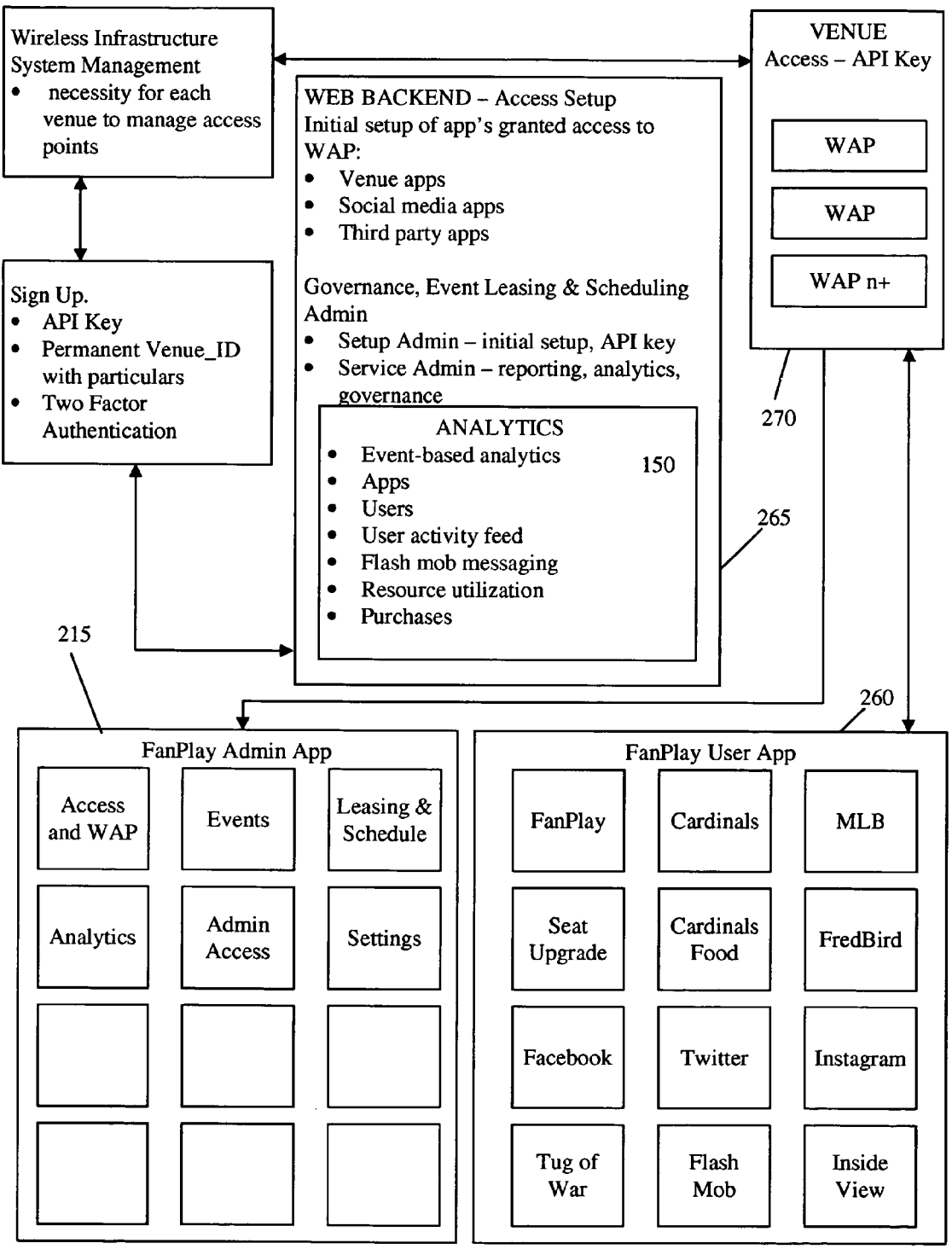

Aspects of the present invention provide computerized methods and systems for permitting or otherwise restricting wireless access to a network to a user device based on, among other things, predefined criteria set, established, or otherwise enabling by an operator of the wireless network the user device is attempting to access. According to aspects as described herein, wireless access 105 to the network may be restricted by requiring any wireless access occur by and through a wrapper application 110 executing on the user device. In the event the user attempts to access the wireless network 105, but does not have the wrapper application 110 installed on their device, the user is directed to an "App Download" webpage, whereby the user may download the wrapper application 110 to access the network 105 (which include one or more wireless access points/routers). FIGS. 1, 2A and 2B illustrate exemplary methods and systems of permitting network access via a wrapper application. In these exemplary methods and systems, a wrapper application ("wrapper app") 110 executes on a user device and acts as a "conduit" for authorized mobile applications executing on the user device.

The business/venue may configure its wireless access point/router ("WAP") to only allow wireless network traffic from the wrapper app 100 executing on the user device. It should be noted, however, that any number of WAPs, wrapper apps, and/or user devices may be utilized or otherwise involved, as this description only describes a single WAP and a single wrapper app for ease of description. When the user opens the wrapper app 110 on their device and the wrapper application attempts to access the network 105, the wrapper app 110 is configured to authenticate the user device at 205. This authentication 205 may include, but is not limited to, restrictions on the particular user device as determined by the business/venue 202, as indicated by a device "whitelist" or "blacklist", or by any other suitable means or methods for identifying user devices and associated restrictions or limitations. Once the user device has been successfully authenticated, a uniquely identifiable virtual persona is determined for the user's device as part of a virtual session at 125, as further described below. According to aspects of the present invention, this virtual persona is uniquely identified by one or more of the device's unique identifier, the business/venue 202, the device's location within the venue 202, attributes of the user and/or user device known to the business/venue 202, and other attributes received or retrieved from third parties regarding the user and/or user device, or some combination thereof.

According to aspects of the present invention, the business/venue 202 may additionally authorize one or more secondary applications ("venue apps") at 210 that may access the wireless network via the wrapper app on the user device. For example, the operators of a football stadium may permit sports-oriented mobile applications to access their WAP. In some embodiments, the business/venue 202 may deny wireless network to all other mobile applications, deny wireless access to only certain mobile applications or classes of mobile applications, or otherwise restrict or allow wireless access to mobile applications executing on the user device. In other words, the business/venue 202 may allow or restrict network access by mobile applications in the manner most appropriate for their needs. The authorization of venue apps may be stored as one or more authorization indicators in a database 130 and/or 135, listing, data structure, or other suitable format, or some combination thereof. The indicators may be utilized by the WAP for permitting and/or restricting network traffic as it arrives at the WAP or may be transmitted or otherwise accessed by the wrapper app 100 as predetermined criteria defining which venue app may execute within the context of the wrapper app 110 or may access the wireless network 105 via the wrapper app 110. In this manner, wireless access may be selectively permitted via the wrapper app 100 based on the user device authentication, the uniquely identifiable persona, the predetermined criteria, or some combination thereof.

In some embodiments, the wrapper app 110 displays a listing of authorized venue apps to the user at 140 and/or 260, along with an indication of which apps are already installed on the mobile device and which apps are not installed. The user may then optionally install the applications to their device using the device-appropriate App Store.

According to aspects of the present invention, the predetermined criteria may additionally include an active lease indicating one or more periods of time that the wrapper application permits the user to access the venue apps in the wrapper app. In some embodiments, the predetermined criteria may include, at 215, an active leases associated with each of the secondary applications, each active lease having one or more periods of time that the wrapper app 110 permits the user to access the secondary application associated with each active lease. For example, the business/venue 202 may receive a request from a third party application provider requesting wireless access for their application at the venue 202 during a particular period of time or scheduled period of times. The business/venue 202 may set or otherwise update the predetermined criteria to permit a user to access the third party app via the wrapper app 110 at or during the scheduled times, e.g., if U2 is playing in a concert venue on a Jan. 1, 2015 at 7:00 pm-11:59 pm, a concert goer can access the U2 app via the wrapper app and the U2 app can access the wireless network as needed during that period of time. The predetermined criteria may additionally include a priority indicator for a particular secondary application, which signals the wrapper app 110 to prioritize traffic to/from that secondary application over those that do not have a priority indicator. This advantageously permits the business/venue 202 providing the WAP to prioritize its own or "preferred" applications over other secondary applications.

In some embodiments, the uniquely identifiable virtual persona is created during the creation of a virtual session 125 within the wrapper app. The virtual session 125 may additionally include the predetermined criteria indicating the secondary applications described above. The virtual session 125 may also provide a context within which the secondary applications execute. In other words, the virtual session 125 acts as a "single sign-on" and represents the ability of the user device to access certain secondary applications for a certain period of time in a particular location, wherein virtual session 215 terminates due to the expiration of the active leases described above, a change in location of the user device, some event/condition that invalidates the virtual persona or the virtual session 125, or some combination thereof. In some embodiments, the wrapper app 110 permits the user to save and/or transmit some portion or all of their virtual persona to a centralized server, a cloud-based storage service, a personal computer, the user device, or some combination thereof. This persistent storage of some or all of the virtual persona allows the user to maintain and/or reuse this stored data during future virtual sessions at the same or different business/venue. In some embodiments, the wrapper app 110 may retrieve the user's stored data from a centralized server, a cloud-based storage service, a personal computer, the user device, or some combination thereof, and/or prompt the user to retrieve, import or otherwise use the user's stored data. For example, the prompt may request the location of the stored data and access credentials, if needed.

According to aspects of the present invention, the user may additionally register their device (and indirectly aspects of their virtual persona) via a user web application 140. For example, the user executes the wrapper app 110 on their device either away from or at the venue, and access a registration code that unique identifies the wrapper app 110 and the user device. In some embodiments, the user may register their mobile device by providing a unique identifier for the user device, such as a mobile number associated with the device, an IMEI associated with their device, a MAC address associated with their device, etc., or some combination thereof, and then confirming the registration, such as by text message, email message, telephone call, etc. Once registered, the user may then enter this registration code in the user web application 140 to establish their account, and set, modify or other maintain their user preferences, such as user-defined groups, membership in groups, contact lists of users/virtual personas, demographic information, advertising preferences, etc. In some embodiments, the user registration process may permit the user to associate a stored virtual persona with the registration. The user may establish and/or join groups via the user web application 140, the wrapper app 110, or some combination thereof. A business/venue administrator may establish, update, delete, or otherwise modify groups via the administrative wrapper app at 145 and/or 165, an administrative web application 160, or some combination thereof.

According to aspects of the present invention, the wrapper app 110 collects data regarding itself and all the secondary applications executed, e.g., at 150. This data includes, but is not limited to, application usage, management information, interface information, audit information, and logging information, e.g., number of users using Instagram via the wrapper app, number of image posts and comments, number of users using Twitter and number of tweets sent. For example, the data may include information regarding a particular play or event during a football game, such as halftime, a time out, and/or a specific play.

The collected data may be transmitted, at 155, by the wrapper app to a centralized server, transmitted to cloud storage, transmitted to an appropriate computer, transmitted to an administrative computer device, or some combination thereof. For example, the data may be transmitted to an administrative wrapper app 145 connected to the wireless network, by any appropriate method or manner, such as a peer-to-peer type connection. In this arrangement, the wrapper app 110 on a user device may periodically ping the wireless network for the presence of an administrative wrapper app, the administrative wrapper app may periodically broadcast its presence on the network, or some combination of both may occur, prior to usage data being transmitted to the administrative wrapper app. In this example, an administrative wrapper app is an application that permits its respective user to perform administrative functions to add, update, delete, or otherwise modify aspects of the systems and methods described throughout, e.g., at 145 and 265. This type of arrangement may advantageously permit an administrator to be "on the ground" at the venue, collect usage data, and adjust system parameters as needed. Exemplary administrative functions for performing these and other types of adjustment are described below.

This collection of data advantageously provides the business/venue 202 with use metrics and analytical data regarding user engagement. For example, the business/venue 202 may lease high-density wireless access during a period of time using a wrapper app 110 to control access, e.g., wireless access at a baseball stadium given a playoff game, and collect data pertaining to user engagement during the game. For example, a venue app 115 may provide via the wrapper app 110 a "tug of war" game between the fans at a baseball game, e.g, St. Louis Cardinals fans and Chicago Cubs, at a particular point during the baseball game. The "tug of war" game may have two active leases associated with it, the first of which provides a window for the user to test the app to verify its operation, the second of which defines the start and stop time of the "tug of war" game. Each "side" may repeatedly click a button within the venue app 115, whereby the side with the most number of clicks within a specific time period, e.g., 30 seconds, for the "tug of war" game "wins". The winning side may be presented with an appropriate prize by the venue app 115, such as recognition via one or more TV displays at the venue or a coupon for a free beverage, etc. During the "tug of war" game, the venue app may collect data including the number of participants and their "side". The data may be analyzed and combined with other data sources, such as the stored user data from virtual personas as described above, to generate individual user profiles, aggregated data sets, etc., i.e., analytics for the data 150. The analytics may advantageously then be used by the business/venue 202 to, by way of example and not limitation, sell or rent the data, to adjust pricing for future wifi leasing opportunities, or adjust pricing for advertising through the wrapper app 110. The analytics 135 and/or 150 may also be utilized to adjust pricing in real-time, such advertising costs that adjust with user engagement, number of impressions, time of day, etc. In some embodiments, the wrapper app may be further configured to receive and display advertisements, as determined by the business/venue.

According to aspects of the present invention, one or more administrative functions, e.g., at 145 and 265, are provided to control the operation of the wrapper app 110 and other aspects of the present invention. As noted above, administrative functions may be provided via an administrative wrapper app 145 and/or 165, an administrative web application 160, or some combination thereof. In some embodiments, the wrapper app 110 may include administrative functions that are selectively enabled when operated by an administrator. The administrative functions may include, but are not limited to, session broker functions and traffic manager functions for modifying the predetermined criteria. For example, modifying the predetermined criteria may include associating a bandwidth restriction with an active lease. This type of bandwidth restriction advantageously allows for controlling network congestion and responsiveness during peak periods of network usage. The administrative functions may additionally permit the inclusion of a priority indicator in the predetermined criteria, as noted above, such that the administrator may indicate which secondary applications have "priority access" to the wireless network. In this manner, the business/venue 202 may prioritize traffic from their own applications or third-party applications that have contracted or paid for prioritized traffic. The administrative functions may further include one or more advertising related functions for establishing the display of advertisements via the wrapper app 110, the cost associated with the advertisements, the frequency of which the ads are to be displayed, number of impressions to be delivered, and other functions as needed to support the delivery of advertisements via the wrapper app 110. One of ordinary skill in the pertinent arts will understand third-party systems exist for the management and selection of advertisements, and one or more of these third-party systems may be adapted to receive administrative functions and provide the appropriate advertisements to the administrative functionality for eventual delivery to the wrapper app.

By way of explanation and not limitation, the administrative functions may also include functions related to user security and access, centralized control of wrapper app 110 parameters, such as parameters regarding auditing and logging, as well as programming updates for the wrapper app itself. These functions may apply to a plurality of wrapper apps in aggregate, a subset of wrapper apps, or a particular wrapper app executing on a user device, or some combination thereof. The changes, modifications and updates effected by the administrative functions may be transmitted to one or more wrapper apps in real-time, batched and transmitted in bulk, in response to requests from one or more wrapper apps for updates, or some combination thereof. It is within the scope of the present invention to transmit the administrative changes, modifications, and updates via the network in whatever manner is available or required. Administrative functions may be accessed or otherwise presented to an administrator via one or more user interfaces. By way of demonstration and not limitation, the user interfaces may be presented on a computer display, a mobile device display, some combination thereof, or any other means available for providing a user interface.

In other embodiments, the wrapper app 110 may enable the user identified via a virtual persona to engage in secure, point-to-point communication with other users via the wrapper app 110. Optionally, the point-to-point communication may be encrypted for increased security. The communications may further include messaging capabilities, such as the ability to send text messages, images, and/or video. For example, the user may select one or more other users from a directory of other users present in the venue 202. In some embodiments, the other users with whom the user may message may be determined either randomly among the users present in the venue or based on similarities between the user and the other users, e.g., "flash mob" messaging between users present in the venue. For example, one or more matching algorithms may determine similarities between the user and the other users based on historical, analytical data regarding the user and the other users, such as number of times the users frequented the same venue, joined the same groups via the wrapper app 110, etc. The user may additionally add other users to a contact list for communicating in the future. In some embodiments, the wrapper app 110 may implicit generate contact lists, based on any or all of the factors described above for later use, such that the user can re-engage a user they interacted with previously with a minimum amount of effort. For example, the wrapper app 110 may alert the user to the "geo presence" of another user in the same venue as the user, based on a contact list or the matching criteria described above.

In some embodiments, the point-to-point communication capability permits users to transmit messages and images via the network to one or more screens at the venue 202, as permitted the business/venue/administrator. For example, an administrator may moderate such requests, via the administrative wrapper app or other appropriate mechanism such as SMS, email, etc., to prevent inappropriate messages and images from displaying. In other example, the administrative wrapper app 145 and/or 165 may provide similar functionality to an administrator, allowing the administrator to transmit messages and images via the network to one or more screens at the venue 202. The point-to-point communication may additionally enable communication with a celebrity in the crowd, as permitted by the business/venue/administrator and celebrity. For example, there may exist an administrative function that permits the business/venue/representative of the celebrity to verify a particular user and/or virtual persona as belonging to the celebrity. In this example, the wrapper app 110 may first display a "permission" screen to the celebrity, indicating whether or not they permit other users to communicate with them directly. The wrapper app 110 may additionally allow the celebrity to selectively modify the "verified" flag, e.g., an "incognito mode", so that other users are not aware of their celebrity status and/or presence at the venue.

It should be further understood that the functionality, processes, and data of the present invention may be additionally accessed via one or more Application Programming Interfaces ("API"), e.g., elements 170, 175, 180, and 185. In other words, all or part of the functionality, processes, and data may be accessible programmatically by other applications, systems, and methods, or may access other applications, systems, and method via the APIs or other suitable methods or means for programmatic interaction.

One of ordinary skill in the pertinent arts will recognize that, while various aspects of the present invention are illustrated in FIGS. 1, 2A and 2B as separate elements, one or more of the elements may be combined; merged, omitted, or otherwise modified without departing from the scope of the present invention. Furthermore, the various elements shown throughout FIGS. 1, 2A and 2B may communicate via wired network, wireless network, and/or other appropriate communication technology, or some combination thereof. The lines and arrows shown in FIGS. 1, 2A and 2B are merely illustrative, such that the various elements may communicate directly or indirectly as needed, required, and/or otherwise desired.

Figure 3:
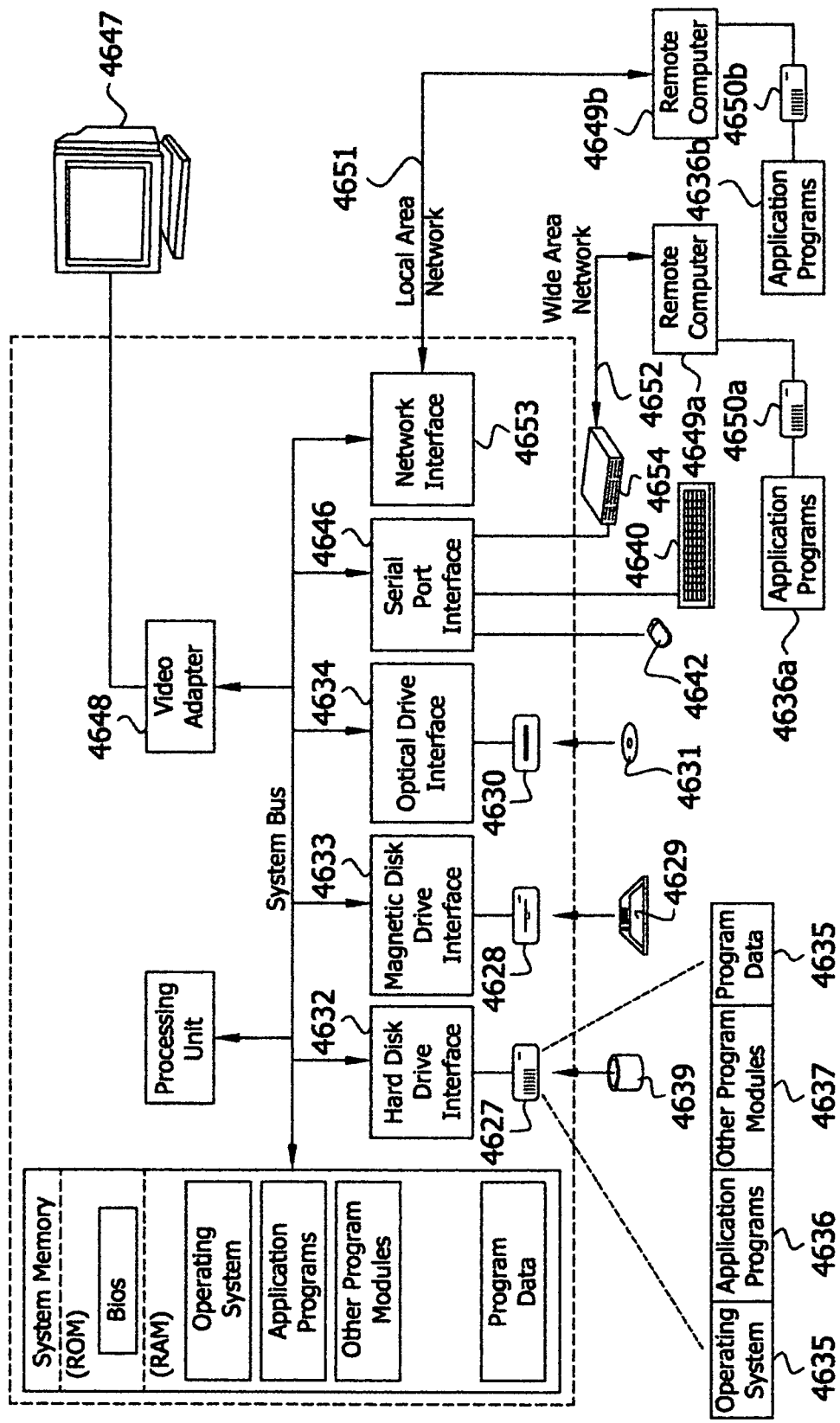
FIG. 3 is a block diagram illustrating an example of a suitable computing system environment in which aspects of the invention may be implemented.

With reference to FIG. 3, an exemplary system for implementing aspects of the invention includes a general purpose computing device in the form of a conventional computer 4320, including a processing unit 4321, a system memory 4322, and a system bus 4323 that couples various system components including the system memory 4322 to the processing unit 4321. The system bus 4323 may be any of several types of bus structures including a memory bus or memory controller, a peripheral bus, and a local bus using any of a variety of bus architectures. The system memory includes read only memory (ROM) 4324 and random access memory (RAM) 4325. A basic input/output system (BIOS) 4326, containing the basic routines that help transfer information between elements within the computer 20, such as during start-up, may be stored in ROM 4324.

The computer 4320 may also include a magnetic hard disk drive 4327 for reading from and writing to a magnetic hard disk 4339, a magnetic disk drive 4328 for reading from or writing to a removable magnetic disk 4329, and an optical disk drive 4330 for reading from or writing to removable optical disk 4331 such as a CD-ROM or other optical media. The magnetic hard disk drive 4327, magnetic disk drive 4328, and optical disk drive 30 are connected to the system bus 4323 by a hard disk drive interface 4332, a magnetic disk drive-interface 33, and an optical drive interface 4334, respectively. The drives and their associated computer-readable media provide nonvolatile storage of computer-executable instructions, data structures, program modules, and other data for the computer 4320. Although the exemplary environment described herein employs a magnetic hard disk 4339, a removable magnetic disk 4329, and a removable optical disk 4331, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 4339, magnetic disk 4329, optical disk 4331, ROM 4324, and/or RAM 4325, including an operating system 4335, one or more application programs 4336, other program modules 4337, and program data 4338. A user may enter commands and information into the computer 4320 through keyboard 4340, pointing device 4342, or other input devices (not shown), such as a microphone, joy stick, game pad, satellite dish, scanner, or the like. These and other input devices are often connected to the processing unit 4321 through a serial port interface 4346 coupled to system bus 4323. Alternatively, the input devices may be connected by other interfaces, such as a parallel port, a game port, or a universal serial bus (USB). A monitor 4347 or another display device is also connected to system bus 4323 via an interface, such as video adapter 4348. In addition to the monitor, personal computers typically include other peripheral output devices (not shown), such as speakers and printers.

The computer 4320 may operate in a networked environment using logical connections to one or more remote computers, such as remote computers 4349 a and 4349 b. Remote computers 4349 a and 4349 b may each be another personal computer, a server, a router, a network PC, a peer device or other common network node, and typically include many or all of the elements described above relative to the computer 4320, although only memory storage devices 4350 a and 4350 b and their associated application programs 36 a and 36 b have been illustrated in FIG. 1. The logical connections depicted in FIG. 1 include a local area network (LAN) 4351 and a wide area network (WAN) 4352 that are presented here by way of example and not limitation. Such networking environments are commonplace in office-wide or enterprise-wide computer networks, intranets and the Internet.

When used in a LAN networking environment, the computer 4320 is connected to the local network 4351 through a network interface or adapter 4353. When used in a WAN networking environment, the computer 4320 may include a modem 4354, a wireless link, or other means for establishing communications over the wide area network 4352, such as the Internet. The modem 4354, which may be internal or external, is connected to the system bus 4323 via the serial port interface 4346. In a networked environment, program modules depicted relative to the computer 4320, or portions thereof, may be stored in the remote memory storage device. It will be appreciated that the network connections shown are exemplary and other means of establishing communications over wide area network 4352 may be used.

One or more aspects of the invention may be embodied in computer-executable instructions (i.e., software), such as a software object, routine or function (collectively referred to herein as a software) stored in system memory 4324 or non-volatile memory 4335 as application programs 4336, program modules 4337, and/or program data 4338. The software may alternatively be stored remotely, such as on remote computer 4349a and 4349b with remote application programs 4336b. Generally, program modules include routines, programs, objects, components, data structures, etc. that perform particular tasks or implement particular abstract data types when executed by a processor in a computer or other device. The computer executable instructions may be stored on a computer readable medium such as a hard disk 4327, optical disk 4330, solid state memory, RAM 4325, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

A programming interface (or more simply, interface) may be viewed as any mechanism, process, or protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the provided detailed description. Some illustrative implementations of a programming interface may also include factoring, redefinition, inline coding, divorce, rewriting, to name a few. There are, however, other ways to implement a programming interface, and, unless expressly excluded, these, too, are intended to be encompassed by the claims set forth at the end of this specification.

Embodiments within the scope of the present invention also include computer-readable media and computer-readable storage media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computerized method for permitting wireless access to a network to a user device based on predefined criteria, said method comprising:
    providing a wrapper application for execution on the user device;
    receiving, at one or more wireless access point ("WAP") devices operatively connected to the network, a wireless transmission from the user device via said wrapper application requesting network access, said wrapper application being configured to authenticate said user device, determine a uniquely identifiable virtual persona for said user device based on successfully authenticating said user device, and selectively execute one or more secondary applications within the context of the wrapper application based on the predefined criteria and said uniquely identifiable virtual persona;
    selectively permitting, by said one or more WAP devices, wireless access to the network by the user device via said wrapper application based on said authentication and said uniquely identifiable virtual persona; and
    collecting analytical information regarding the wireless network access including usage of said wrapper application and said uniquely identifiable virtual persona.

2. The computerized method of claim 1, said method further comprising selectively restricting, by said one or more WAP devices, wireless network access by the user device outside of said wrapper application.

3. The computerized method of claim 1, said predefined criteria including an active lease having an associated length, said length of the active lease indicating a period of time said wrapper application permits the user to access said one or more secondary applications.

4. The computerized method of claim 3, said method further permitting wireless access to the network to one or more other user devices, said method further comprising:
    sending, via said wrapper application executing on the user device, one or more outbound communications to the one or more other user devices on the network during said active lease; and
    receiving, via said wrapper application executing on the user device, one or more inbound communications to one or more other user devices on the network functions during said active lease.

5. The computerized method of claim 1, said method further including:
    displaying, via a computing device operatively connected to the network, at least one user interface for providing administrative functions to a user;
    receiving, at a computer server, a user selection of one or more of said administrative functions for modifying a network access parameter;
    transmitting, via the network, said modified network access parameters to said one or more WAP devices; said selectively permitting, by said one or more WAP devices, wireless access to the network by the user device via said wrapper application based on a function of said authentication, said uniquely identifiable virtual persona, and said modified network access parameter.

6. The computerized method of claim 5, said administrative functions including at least one of a function for updating said one or more secondary applications that may execute within the context of the wrapper application.

7. A computerized system for providing wireless access control ("WAC") of one or more user devices to a network via a wrapper application executing on the one or more user devices, said system comprising:

one or more wireless access point ("WAP") devices, said one or more wireless access point devices being operatively connected to the network;

one or more WAC computing devices for executing computer-executable instructions for performing one or more WAC functions, said functions including:

configuring said one or more WAP devices to selectively permit access to the network by the one or more user devices executing the wrapper application, said wrapper application being configured to authenticate said user device, determine a uniquely identifiable virtual persona for said user device based on successfully authenticating said user device, and selectively execute one or more secondary applications within the context of the wrapper application based on the predefined criteria and said uniquely identifiable virtual persona;

receiving, at one or more wireless access point ("WAP") devices operatively connected to the network, a wireless transmission from the user device requesting network access, selectively permitting, by said one or more WAP devices, wireless access to the network by the user device via said wrapper application based on said authentication and said uniquely identifiable virtual persona; and collecting analytical information regarding the wireless network access including usage of said wrapper application and said uniquely identifiable virtual persona.

8. The computerized system of claim 7, said functions further comprising selectively restricting, by said one or more WAP devices, wireless network access based on an execution status of the wrapper application executing on each of the one or more user devices.

9. The computerized system of claim 7, said predefined criteria including the length of an active lease, said length of the active lease indicating a period of time said wrapper application permits the user to access said one or more secondary applications.

10. The computerized system of claim 7, said predefined criteria including traffic management rules including limitations on network bandwidth consumption, said limitations including at least one of a day-of-time restriction and percentage-of-total-bandwidth limitations.

11. The computerized system of claim 7, said functions further including:

displaying, via a computing device operatively connected to the network, at least one user interface for providing administrative functions to a user;

receiving, at a computer server, a user selection of one or more of said administrative functions for modifying a network access parameter;

transmitting, via the network, said modified network access parameters to said one or more WAP devices; said selectively permitting, by said one or more WAP devices, wireless access to the network by the user device via said wrapper application based on a function of said authentication, said uniquely identifiable virtual persona, and said modified network access parameter.

12. The computerized system of claim 7, said administrative functions including at least one of a function for updating said one or more secondary applications that may execute within the context of the wrapper application.

13. The computerized system of claim 7, said system further comprising an external display, said computer-executable instructions further comprising instructions for receiving a communication from the user device via said wrapper application and selectively displaying said communication via said external display.

14. A computerized method for wirelessly accessing a network via a user device, said user device accessing the network via a wireless access point ("WAP") performing wireless access control ("WAC"), said method comprising:

executing, on the user device, a wrapper application executing on the user device, said wrapper application being configured to authenticate said user device, determine a uniquely identifiable virtual persona for said user device based on successfully authenticating said user device, and selectively execute one or more secondary applications within the context of the wrapper application based on said uniquely identifiable virtual persona;

transmitting, via said wrapper application executing on the user device, a request to the wireless access point for network access, said request including said identifiable virtual persona;

receiving, at the user device executing said wrapper application, access to the network based on said request.

15. The computerized method of claim 14, said method further comprising:

displaying, via said wrapper application executing on the user device, a user interface indicating to the user said one or more secondary applications stored on the user device for execution;

transmitting, via said wrapper application executing on the user device, a request for a listing of additional secondary applications not stored on the user device that may be executed within the context of said wrapper application, said request including said identifiable virtual persona; and receiving, via the network, said listing based on a function of said identifiable virtual persona.

16. The computerized method of claim 14, wherein the WAC includes one or more predefined criteria, wherein said receiving of said listing is further based on the one of more predefined criteria, where said receiving access to the network is further based on the one or more defined criteria.

17. The computerized method of claim 16, said predefined criteria including a length of an active lease, said length of the active lease indicating a period of time said wrapper application permits the user to access said one or more secondary applications.

18. The computerized method of claim 17, said method comprising removing said one or more secondary application after expiration of said pre-defined period of time.

19. The computerized method of claim 14, said predefined criteria including traffic management rules including limitations on network bandwidth consumption, said limitations including at least one of a day-of-time restriction and total-bandwidth limitation.

* * * * *